J. BLAIN.
CHEESE SLICER.
APPLICATION FILED MAY 22, 1911.

1,005,128.

Patented Oct. 10, 1911.
2 SHEETS—SHEET 1.

Witnesses

Inventor
James Blain
By J. A. Gourick
Attorney

J. BLAIN.
CHEESE SLICER.
APPLICATION FILED MAY 22, 1911.

1,005,128.

Patented Oct. 10, 1911.
2 SHEETS—SHEET 2.

Witnesses

Inventor
James Blain
By _____
Attorney

UNITED STATES PATENT OFFICE.

JAMES BLAIN, OF SPRINGFIELD, MISSOURI.

CHEESE-SLICER.

1,005,128.  Specification of Letters Patent.  Patented Oct. 10, 1911.

Application filed May 22, 1911. Serial No. 628,810.

*To all whom it may concern:*

Be it known that I, JAMES BLAIN, a citizen of the United States, and resident of Springfield, in the county of Greene and State of Missouri, have invented certain new and useful Improvements in Cheese-Slicers, of which the following is a specification.

My invention relates to devices for holding and dispensing longhorn cheese, and has for its object the provision of a device that is simple in construction and inexpensive in cost of manufacture; one in which the cheese is kept from contamination by insects, dust and vermin, and which is so constructed that it is capable of being easily and thoroughly cleaned.

My invention will be described in detail hereinafter and illustrated in the accompanying drawings in which—

Figure 1:
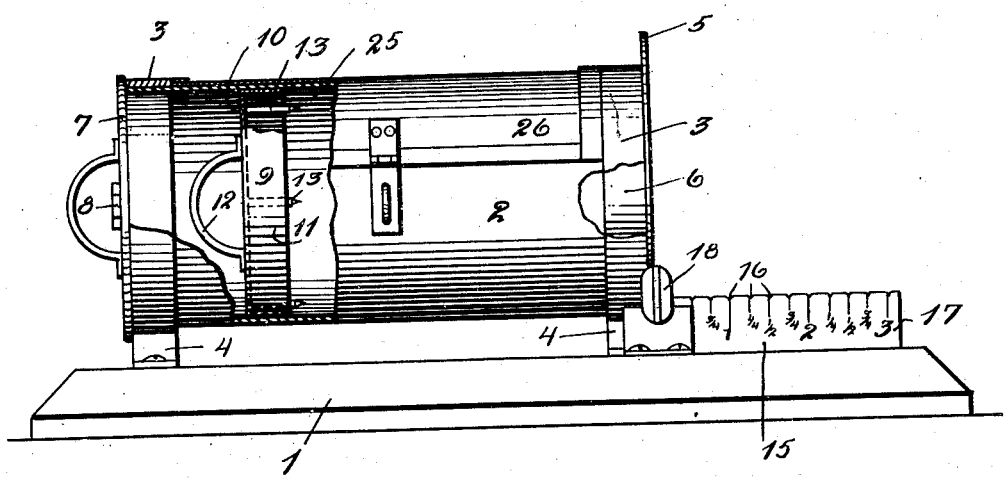
Figure 3:
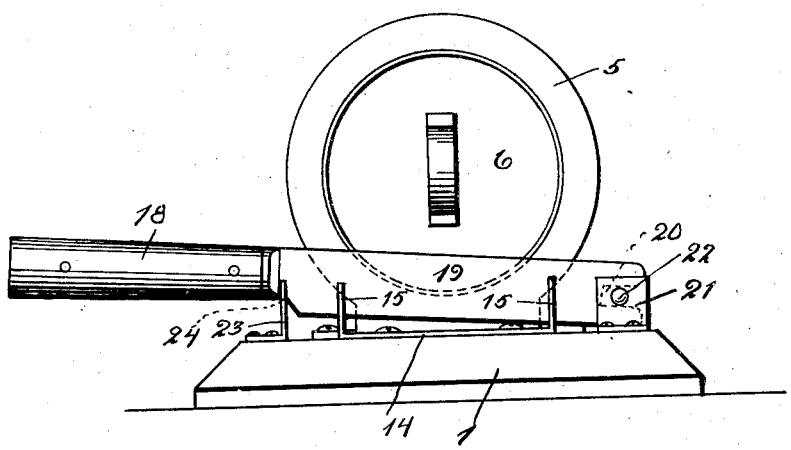
Figure 2:
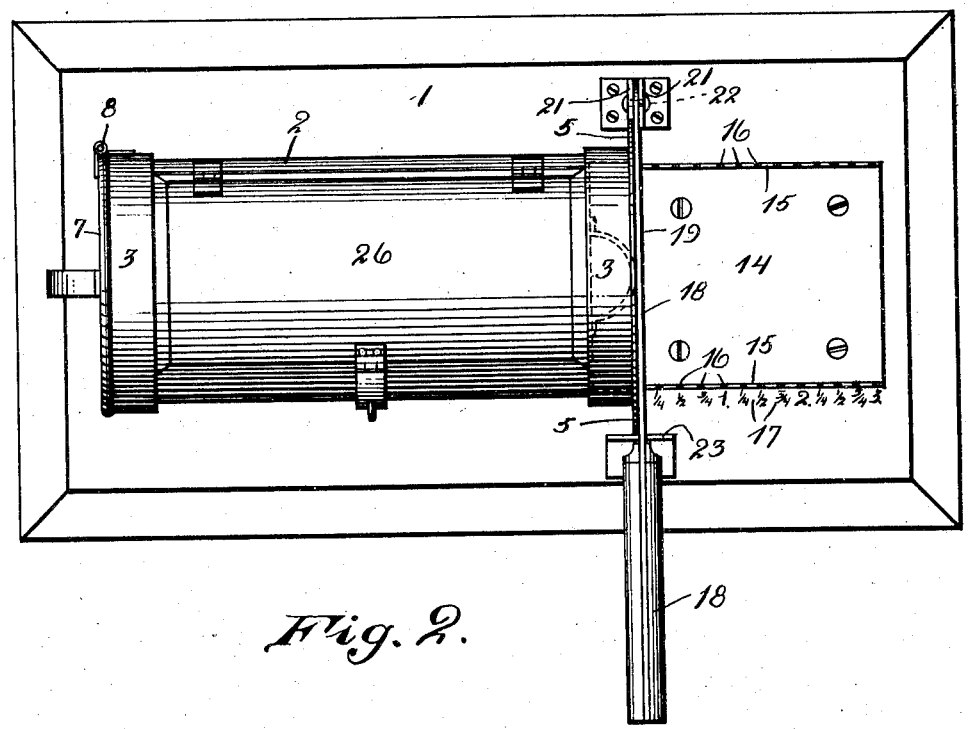
Figure 4:
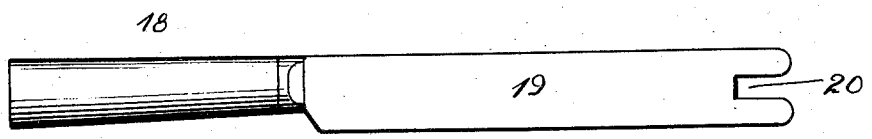

Figure 1, is a side view partly in section of my improved cheese slicer, Fig. 2, a top plan view, Fig. 3, a front end view, and Fig. 4, a detail view of the knife.

In the drawings similar reference characters will be used to designate corresponding parts in the several views.

1 indicates a suitable base made of any desired material, or if desired the base may be a counter or table in the store.

Mounted on base 1 is a cylindrical casing 2 secured thereto by suitable supports 3 having legs 4 engaging the base. Cylindrical casing 2 is designed to receive a cheese, of the variety known as "Longhorn cheeses," the two ends of the casing being open so that the cheese may be inserted from either end.

The front end of the casing is provided with a knife guide comprising a lateral flange 5 and is closed by a plug-like cover 6 that is held in place by frictional contact with the inner surface of the casing, while its other end is provided with a door 7 hinged as shown at 8 to the casing 1.

9 designates a plunger slidably mounted in casing 2 and consisting of a disk 10 having a flange 11 around its edge, a handle 12 secured thereto and pins or spikes 13 projecting therefrom. In use the plunger 9 engages the rear end of the cheese, the flange 11 inclosing its edge, and the pins or spikes 13 piercing the end of the cheese.

In use, after the cheese is placed in the casing, it is pushed out by hand, the hand being inserted through the rear end of the casing after opening the door 7, the cover 6 having been removed to permit egress of the cheese.

Secured to base 1 opposite the front end of the casing is a gage consisting of a plate 14 having upwardly extending side flanges 15 formed with notches 16. In use a plate (not shown) or the cheese knife, to be hereinafter described, is placed in oppositely disposed notches 16 in the flanges 15 to stop the outward movement of the cheese at the desired position, so that by cutting off the end of the cheese extending out of the front end of the casing the amount of the cheese desired by the purchaser will be removed from the body of the cheese. To guide the operation in the use of the gage, a scale 17 is marked on the flanges 15 or on the plate 14 or base 1 adjacent to the flanges as desired.

The cutting implement consists of a knife 18 having the end of its blade 19 provided with a notch 20.

21 indicates uprights secured to base 1 and 22 a pin secured to said uprights to receive the notch 20 and forming a pivot for the blade.

23 indicates an upright secured to base 1 on the opposite side of the casing 2 from uprights 21, and provided with a notch 24 to receive the end of blade 19 adjacent to the handle of the knife to limit the downward movement of the blade in making a cutting stroke.

25 indicates an opening in the top of casing 2 closed by hinged door 26; said opening 25 being provided to give easy access to all parts of the casing in cleaning it after removal of a cheese and before another is placed therein.

As heretofore stated the cheese after having been placed in position in casing 2 and engaged by plunger 9 is moved outwardly by hand in dispensing the cheese, and when the end of the cheese is moved outwardly far enough, as indicated by gage heretofore referred to, the end outside of the casing is cut off with the knife 18. The cover 6 is then replaced in the front end of the casing, the cheese being pushed back by the operation of inserting the cover in the end of the casing and the door 7 being closed the cheese will be preserved from contamination by dust, insects and vermin.

Having thus described my invention what I claim is—

1. In a cheese slicer, a casing adapted to contain a cheese, a slidably removable cover in one end of the casing, a door hingedly secured to the other end of the casing, and a plunger slidably mounted in the casing.

2. In a cheese slicer, a casing adapted to contain a cheese, a removable cover in one end of the casing, a door hingedly secured to the other end of the casing, an opening in the top of the casing, a door closing said opening in the top of the casing, and a plunger slidably mounted in the casing.

3. In a cheese slicer, an elongated casing, a plunger slidably mounted in said casing and having a laterally extending flange adapted to inclose the end of a cheese, pins or spikes secured to the plunger, and a handle secured to the plunger to actuate it.

4. In a cheese slicer, a cylindrical casing having its ends open, a plug adapted to be slidably mounted in one end of the casing, a door hingedly secured to the other end of the casing, a plunger slidably mounted in the casing, and a gage opposite the plugged end of the casing, said gage consisting of a plate having upwardly extending side flanges, the upper edges of said flanges being formed with notches adapted to receive a stopping member, and a scale on the flanges or approximately thereto, and indicating the notches aforesaid.

In testimony whereof I hereunto affix my signature in the presence of two witnesses.

JAMES BLAIN.

Witnesses:
 MOLLIE MILLER,
 DAVID N. MITCHELL.